US008854252B2

(12) United States Patent
Holder

(10) Patent No.: US 8,854,252 B2
(45) Date of Patent: Oct. 7, 2014

(54) MULTI-MODE, MULTI-STATIC INTERFEROMETER UTILIZING PSEUDO ORTHOGONAL CODES

(75) Inventor: Ernest Jefferson Holder, Marietta, GA (US)

(73) Assignee: Propagation Research Associates, Inc., Marietta, GA (US)

( * ) Notice: Subject to any disclaimer, the term of this patent is extended or adjusted under 35 U.S.C. 154(b) by 1470 days.

(21) Appl. No.: 12/504,219

(22) Filed: Jul. 16, 2009

(65) Prior Publication Data

US 2014/0253368 A1 Sep. 11, 2014

Related U.S. Application Data

(60) Provisional application No. 61/096,616, filed on Sep. 12, 2008.

(51) Int. Cl.
*G01S 13/42* (2006.01)
*G01S 13/00* (2006.01)
*H04B 7/08* (2006.01)

(52) U.S. Cl.
CPC .............. *G01S 13/003* (2013.01); *H04B 7/086* (2013.01)
USPC ............. 342/107; 342/67; 342/108; 342/139; 342/140; 342/156

(58) Field of Classification Search
CPC ....... G01S 13/5244; G01S 7/292; G01S 3/74; G01S 13/003; G01S 13/284; H04B 7/086; H04B 7/0615; H01Q 3/2605; H01Q 3/2629
USPC ....................... 342/16, 67, 81, 107–108, 115, 342/139–140, 156–158

See application file for complete search history.

(56) References Cited

U.S. PATENT DOCUMENTS

| | | | | |
|---|---|---|---|---|
| 6,822,606 | B2 * | 11/2004 | Ponsford et al. | 342/192 |
| 6,867,731 | B2 * | 3/2005 | Dizaji et al. | 342/159 |
| 7,151,483 | B2 * | 12/2006 | Dizaji et al. | 342/201 |
| 7,570,211 | B1 * | 8/2009 | Jensen et al. | 342/378 |
| 7,834,807 | B2 * | 11/2010 | Chang | 342/370 |
| 8,120,526 | B2 | 2/2012 | Holder | |

(Continued)

FOREIGN PATENT DOCUMENTS

| | | | |
|---|---|---|---|
| DE | 102004003304 B3 * | 3/2014 | |
| ES | 2449266 T3 * | 3/2014 | |
| WO | WO 2007016098 A3 * | 4/2007 | |
| WO | WO 2013163629 A1 * | 10/2013 | |

*Primary Examiner* — John B Sotomayor
(74) *Attorney, Agent, or Firm* — Alston & Bird LLP

(57) ABSTRACT

A system for providing a multi-mode, multi-static interferometer may include a transmitter array, a receiver array and a processor. The transmitter array includes at least a first transmitter and a second transmitter spatially separated from each other by a first known distance. The receiver array includes at least a first receiver and a second receiver spatially separated from each other by a second known distance. The receiver array is positioned to enable receipt of a return signal from transmissions provided by the transmitter array and reflecting off an object. The processor is configured to enable the transmitter array to generate uniquely coded signals and configured to distinguish, based on the uniquely coded signals, a first signal transmitted by the first transmitter from a second signal transmitted by the second transmitter in response to reception of a combined signal including reflected signals corresponding to at least the first and second signals by the receiver array.

27 Claims, 11 Drawing Sheets

(56) References Cited

U.S. PATENT DOCUMENTS

| | | | |
|---|---|---|---|
| 8,274,425 B2 | 9/2012 | Yeary et al. | |
| 8,694,030 B2 * | 4/2014 | Campbell et al. | 455/458 |
| 2003/0210179 A1 * | 11/2003 | Dizaji et al. | 342/159 |
| 2004/0178951 A1 * | 9/2004 | Ponsford et al. | 342/192 |
| 2005/0195103 A1 * | 9/2005 | Davis et al. | 342/99 |
| 2005/0242985 A1 * | 11/2005 | Ponsford et al. | 342/59 |
| 2008/0291083 A1 * | 11/2008 | Chang | 342/354 |
| 2009/0109086 A1 * | 4/2009 | Krieger et al. | 342/25 F |
| 2009/0160707 A1 * | 6/2009 | Lakkis | 342/367 |
| 2009/0322614 A1 * | 12/2009 | Na et al. | 342/377 |

* cited by examiner

MULTI-MODE, MULTI-STATIC INTERFEROMETER UTILIZING PSEUDO ORTHOGONAL CODES

CROSS REFERENCE TO RELATED APPLICATIONS

This application claims the benefit of U.S. Provisional Application No. 61/096,616, filed Sep. 12, 2008, the contents of which are incorporated herein in their entirety.

TECHNOLOGICAL FIELD

Embodiments of the present invention relate generally to radar technology and, more particularly, relate to a multi-mode, multi-static interferometer.

BACKGROUND

The central goal of a radar system is typically to provide detection and location determination of one or more reflective possibly non-cooperative objects (RPNCO). While the physical limits of such a goal may be well understood and characterized through mathematical tools such as the radar range equation, often other considerations play a large part in the success of a given radar design in accomplishing these goals. Specifically, current radar designs sometimes suffer performance degradation when faced with tasks such as tracking and/or detecting a large number of objects at one time due to the radar's resources being overwhelmed. Other problems such as multipath interference, which can make practical detection impossible, and accurate angular position determination, which may be required for high precision tracking, can also be difficult to achieve. Each of these difficulties can be overcome to some extent by replication of radar resources, more sophisticated processing, and/or the addition of more radiative power.

Various radar techniques are currently used to determine the position and motion of a RPNCO using range and angle determination systems. Examples include the mono-static radar, multi-static radar and interferometric radar. The mono-static radar, which is the oldest of the techniques, was developed in the 1920s as a method that calculates the range to a RPNCO by measuring the time it takes for an echo of a transmitted pulse to return to a receiver complex and dividing by the speed of light. An angle determination is made by observing the direction in which the transmitter and receiver aperture are pointing. There are many refinements possible over this basic technique possible including: 1) using coherent processing of the echos to more precisely determine the range; 2) using phased array apertures, which include not one but a plurality of elements, to steer the beam electrically instead of mechanically (thereby allowing for mono-pulse angular determination, which improves angle estimation); and 3) pulse compression, which allows for long low-power pulses to replace very high-power very-short pulses resulting in a reduction of transmitter costs.

Multi-static radar typically includes a bistatic configuration where a single transmitter and a single receiver are separated by a known distance. Using the same timing techniques as those that are used in the mono-static radar case, the range and angle to the RPNCO can be determined. However, the angular accuracy is improved due to the separation distance between the transmitter and receiver.

Interferometric radars have been more recently developed to utilize a single transmitter and multiple receivers with phase comparisons of the echo received at each receiver to determine range and angle to the RPNCO relatively precisely. While each of the above described techniques is useful for either multiple object detection, high resolution tracking, or multipath mitigation under some circumstances, none of the techniques enable all of these functions to be performed in a balanced way.

In light of the issues discussed above, it is desirable to provide an improved radar system that may overcome at least some of the disadvantages described above.

BRIEF SUMMARY OF EXEMPLARY EMBODIMENTS

Embodiments of the present invention are therefore provided that provide for the joint determination of the location and motion of possibly non-cooperative objects within a volume of space through the use of coded signals broadcast from a set of spatially distributed transmitters and received with a set of spatial distributed receivers that may or may not be collocated with the transmitters. Some main parts of an exemplary embodiment may include one or more instances of a transmitter spatial layout, a receiver spatial layout, a coded signal design, a transmitter design, a receiver design, a signal processing algorithm, and a position determination algorithm. Example embodiments of the invention may be used to allow a set of receivers to detect (e.g., via rough positioning), and track (e.g., via precise positioning) one or more objects within the range of the transmitted signals relative to the location of the transmitters and/or receivers. Depending on the mode of operation, receivers according to exemplary embodiments may be enabled to determine the position of objects at a greater distance than single receiver can, operate in the presence of more significant multipath than a single receiver can, and/or determine the angular position of the objects more precisely than a single receiver.

According to an exemplary embodiment, a system for providing a multi-mode, multi-static interferometer utilizing pseudo orthogonal codes is provided. The system may include a transmitter array, a receiver array and a processor. The transmitter array includes at least a first transmitter and a second transmitter spatially separated from each other by a first known distance. The receiver array includes at least a first receiver and a second receiver spatially separated from each other by a second known distance. The receiver array is positioned to enable receipt of a return signal from transmissions provided by the transmitter array and reflecting off an object. The processor is configured to enable the transmitter array to generate uniquely coded signals and configured to distinguish, based on the uniquely coded signals, a first signal transmitted by the first transmitter from a second signal transmitted by the second transmitter in response to reception of a combined signal including reflected signals corresponding to at least the first and second signals by the receiver array.

According to another exemplary embodiment, a method for providing a multi-mode, multi-static interferometer utilizing pseudo orthogonal codes is provided. The method may include providing for generation of signals from respective transmitters of a transmitter array comprising at least a first transmitter and a second transmitter spatially separated from each other by a first known distance in which the first transmitter and the second transmitter each generate uniquely coded signals that are distinguishable from each other. The method may further include receiving return signals from transmissions provided by the transmitter array and reflecting off an object at a receiver array comprising at least a first receiver and a second receiver spatially separated from each other by a second known distance. The method may also include distinguishing, based on the uniquely coded signals, a first signal transmitted by the first transmitter from a second signal transmitted by the second transmitter in response to reception of a combined signal including reflected signals corresponding to at least the first and second signals by the receiver array.

According to an exemplary embodiment, a computer program product for providing a multi-mode, multi-static interferometer utilizing pseudo orthogonal codes is provided. The computer program product includes at least one computer-readable storage medium having computer-executable program code instructions stored therein. The computer-executable program code instructions may include program code instructions for providing for generation of signals from respective transmitters of a transmitter array comprising at least a first transmitter and a second transmitter spatially separated from each other by a first known distance in which the first transmitter and the second transmitter each generate uniquely coded signals that are distinguishable from each other, for receiving return signals from transmissions provided by the transmitter array and reflecting off an object at a receiver array comprising at least a first receiver and a second receiver spatially separated from each other by a second known distance, and for distinguishing, based on the uniquely coded signals, a first signal transmitted by the first transmitter from a second signal transmitted by the second transmitter in response to reception of a combined signal including reflected signals corresponding to at least the first and second signals by the receiver array.

Accordingly, embodiments of the present invention may enable improved detection and tracking with respect to multiple target and other difficult operational environments.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
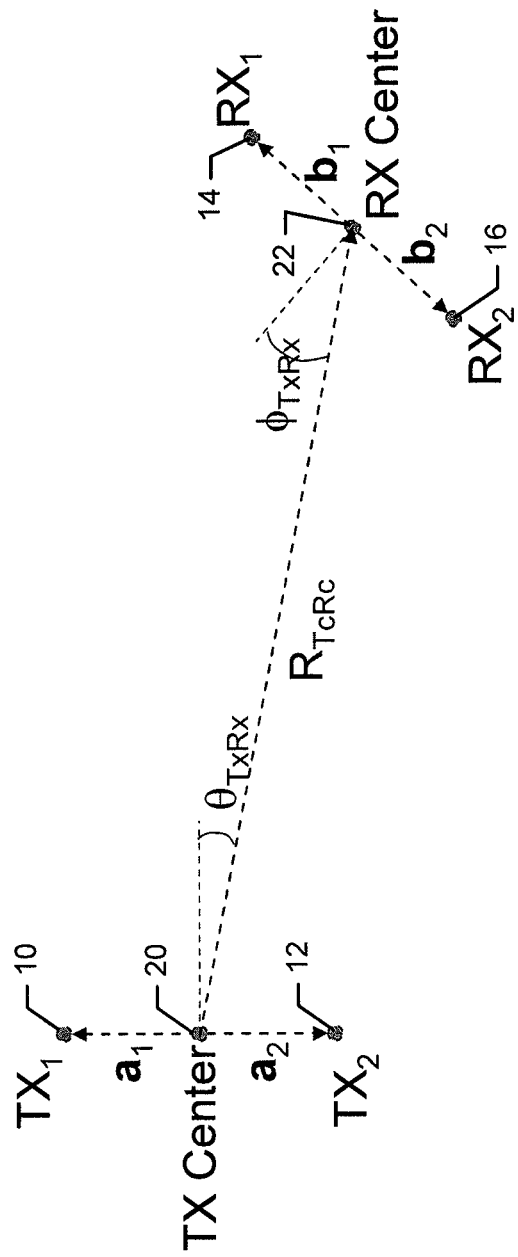
FIG. 1 is a diagram of a set of spatially distributed transmitters and receivers according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Some embodiments of the present invention provide a system and method for tracking a moving object. The system may include a spatially-distributed (SD) transmitter comprising at least first and second transmitters that are spatially separated from each other, and a SD receiver including at least first and second receivers that are spatially separated from each other. In an exemplary embodiment, each transmitter transmits a uniquely coded signal, and the coded signals are coded with different codes that enable the coded signals to be distinguishable from each other. Examples of possible coding techniques that have this property include, but are not limited to, time division multiplexing, frequency division multiplexing, and code division multiplexing. Each receiver may be configured to receive the coded signals and separate the coded signals from one another. The system may also include a processor that processes the separated signals and is able to compare, in a coherent and an non-coherent fashion, the phase and timing of arrival of reflected signals to each other and to the transmitted signals in order to determine at least the position of the RPNCO relative to the receiver.

The system may include at least three different modes of operation that are used for different operational missions. The first mode may include the independent operation of pairs of transmitters and receivers looking in possibly different directions for the purpose of detecting and tracking more RPNCO than would be possible with all of the system's elements acting in concert. This independent processing of transmitter and receiver pairing may improve search time over a conventional radar. The second mode may include the non-coherent processing of signals from each combination of transmitter and receiver in order to mitigate multipath interference which each path will experience differently. This process may reduce the impact that multipath reflections have on signal processing. The third mode may include coherent processing of signals from each combination of transmitter and receiver to extend the range and improve the accuracy of the system over any single combination of transmitter and receiver.

FIG. 1, one exemplary embodiment of the invention, illustrates a diagram of a set of spatially distributed transmitters and receivers and the information that may be used a priori to enable operation of an exemplary embodiment of the present invention. For the sake of clarity, FIG. 1 only shows two dimensions and also only shows two transmitters (e.g., $TX_1$ 10 and $TX_2$ 12) and two receivers (e.g., $RX_1$ 14 and $RX_2$ 16). However, it should be understood that additional instances of each of the aforementioned items may be included. In all subsequent diagrams and discussion it should be assumed that distances $a_1$, $a_2$, $b_1$, $b_2$ and angles $\Theta_{TxRx}$ and $\phi_{TxRx}$ are known with a high level accuracy to a processor (e.g., processor 40 of FIG. 2) that can compare times of arrival and phases of the various signals in various modes.

In relation to FIG. 1, the distance between $TX_1$ 10 and $TX_2$ 12 is $a_1+a_2$. Moreover, $a_1=a_2$ so that a point TX Center 20 is a distance $a_1$ from $TX_1$ 10 and a distance $a_2$ from $TX_2$ 12 along a line connecting $TX_1$ 10 and $TX_2$ 12. Meanwhile, the distance between $RX_1$ 14 and $RX_2$ 16 is $b_1+b_2$. Moreover, $b_1=b_2$ so that a point RX Center 22 is a distance $b_1$ from $RX_1$ 14 and a distance $b_2$ from $RX_2$ 16 along a line connecting $RX_1$ 14 and $RX_2$ 16. The processor may be configured to determine these values based on locational information regarding $TX_1$ 10, $TX_2$ 12, $RX_1$ 14 and $RX_2$ 16, or the values described above may be entered by an operator. After TX Center 20 and RX Center 22 are known, the processor may be enabled to determine the values of angles $\Theta_{TxRx}$ and $\phi_{TxRx}$ in reference to TX Center 20 and RX Center 22 based on signals transmitted by $TX_1$ 10 and $TX_2$ 12 and subsequently received by $RX_1$ 14 and $RX_2$ 16.

Figure 2:
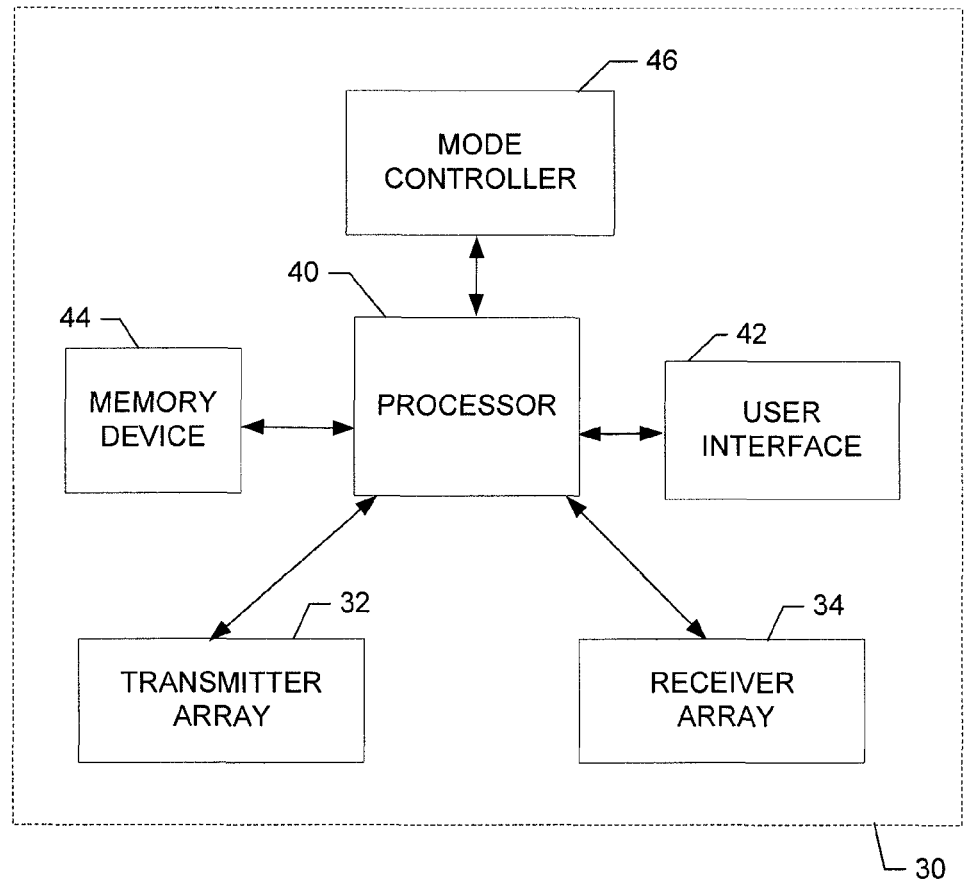
FIG. 2 illustrates a block diagram of an apparatus for providing a multi-mode, multi-static interferometer based according to an exemplary embodiment of the present invention.

FIG. 2, one exemplary embodiment of the invention, illustrates a block diagram of a high level depiction of an apparatus for providing a multi-mode, multi-static interferometer based on the general system shown in FIG. 1. In this regard, the apparatus 30 may include or otherwise be in communication with a transmitter array 32 (e.g., $TX_1$ 10 and $TX_2$ 12), a receiver array 34 ($RX_1$ 14 and $RX_2$ 16), a processor 40, a user interface 42, and a memory device 44. The memory device 44 may include, for example, one or more volatile and/or non-volatile memory devices. The memory device 44 may be configured to store information, data, applications, instructions or the like for enabling the apparatus 30 to carry out various functions in accordance with exemplary embodiments of the present invention. For example, the memory device 44 could be configured to buffer input data for processing by the processor 40. Additionally or alternatively, the memory device 44 could be configured to store instructions for execution by the processor 40.

The processor 40 may be embodied in a number of different ways. For example, the processor 40 may be embodied as various processing means such as one or more instances of a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 40 may be configured to execute instructions stored in the memory device 44 or otherwise accessible to the processor 40. As such, whether configured by hardware or software methods, or by a combination thereof, the processor 40 may represent an entity (e.g., physically embodied in circuitry) capable of performing operations according to embodiments of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be embodied as one or more of a processor of a specific device (e.g., a radar waveform processor and/or a radar signal processor) adapted for employing embodiments of the present invention by further configuration of the processor 40 by instructions for performing the algorithms and/or operations described herein.

The user interface 42 may be in communication with the processor 40 to receive an indication of a user input at the user interface 42 and/or to provide an audible, visual, mechanical or other output to the user. As such, the user interface 42 may include, for example, a keyboard, a mouse, a joystick, a display, a touch screen, a microphone, a speaker, or other input/output mechanisms.

In an exemplary embodiment, the processor 40 may be embodied as, include or otherwise control a mode controller 46. The mode controller 46 may be any means such as a device or circuitry operating in accordance with software or otherwise embodied in hardware or a combination of hardware and software (e.g., processor 40 operating under software control, the processor 40 embodied as an ASIC or FPGA specifically configured to perform the operations described herein, or a combination thereof) thereby configuring the device or circuitry to perform the corresponding functions of the mode controller 46 as described below. In an exemplary embodiment, the mode controller 46 may be configured to alter a mode of operation of the apparatus 30 in response to operator input (e.g., via the user interface 42) or in response to stimuli triggering a preprogrammed mode change by the mode controller 46. As such, in some cases, the mode controller 46 may analyze data (e.g., radar return and timing information) processed by the processor 40 in order to determine a corresponding operating mode in which the apparatus 30 should operate based on predefined criteria. The mode controller 46 may therefore be configured to shift operational modes based on the predefined criteria.

Figure 3:
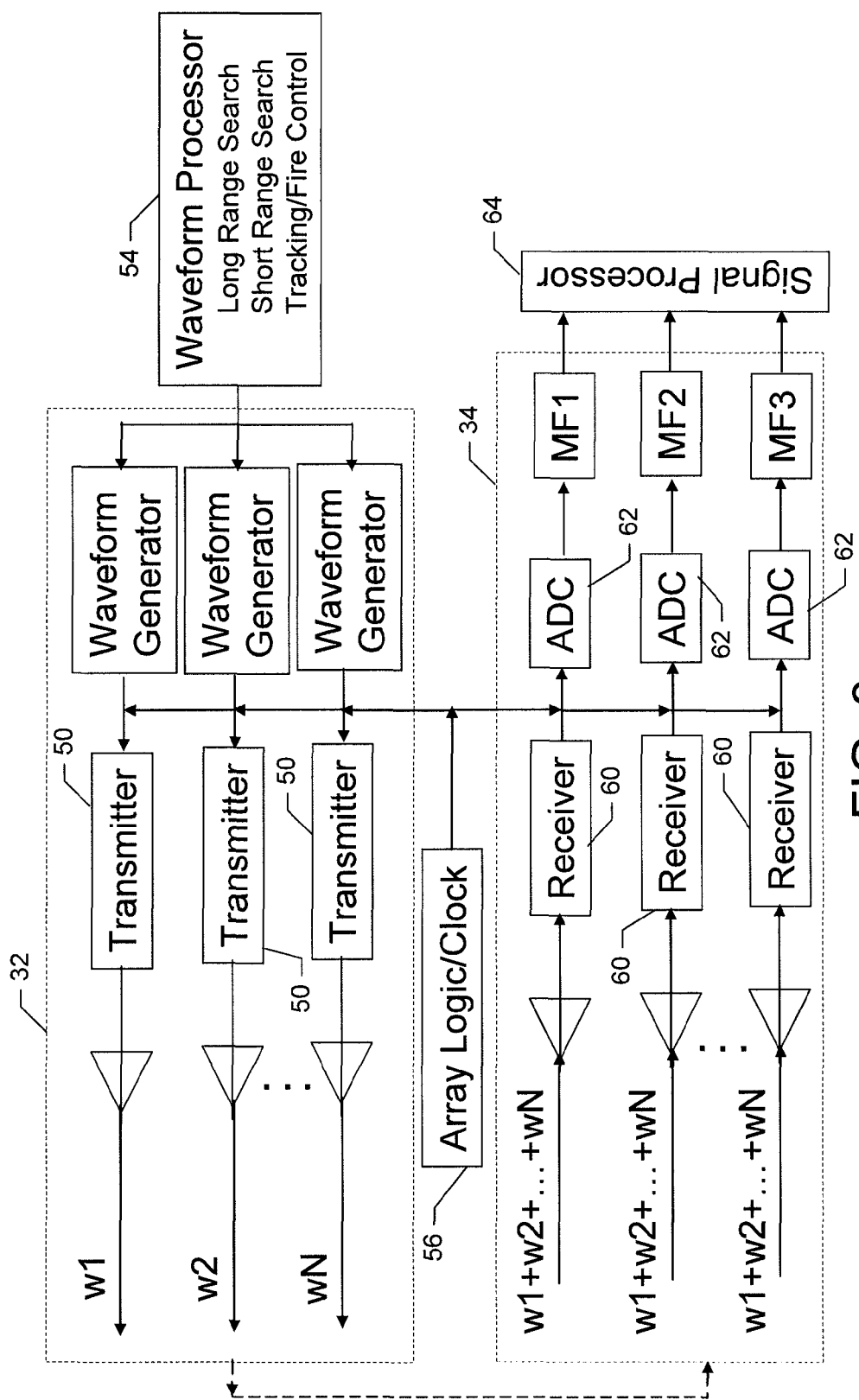
FIG. 3 illustrates a block diagram of a more detailed view of a portion of the apparatus of FIG. 2 corresponding to an orthogonal radar module according to an exemplary embodiment of the present invention.

FIG. 3 illustrates a block diagram of a more detailed view of a portion of the apparatus 30 of FIG. 2 corresponding to an orthogonal radar module according to an exemplary embodiment. In particular, the transmitter array 32 and the receiver array 34 are shown in greater detail in FIG. 3. As shown in FIG. 3, the transmitter array 32 may include a plurality of transmitters 50 (which may correspond to $TX_1$ 10 and $TX_2$ 12 and in some cases additional transmitters) and a corresponding waveform generator 52 for each of the transmitters 50. The waveform generators 52 may each be configured to generate waveforms based on control signals provided by a waveform processor 54. The waveform processor 54 may be a part of, in communication with or under the control of the processor 40 and may be configured to operate in one of various modes (e.g., a long range search mode, a short range search mode, and a tracking/fire control mode) based on an output of the mode selector 46. As such, based on the current mode of operation, the waveform processor 54 may provide control signals to the waveform generators 52 in order to enable the waveform generators 52 to generate waveforms for transmission by the transmitters 50. An array logic/clock 56 may provide timing information to transmitter array 32 so that corresponding timing information is known for each transmitted signal (e.g., including w1, w2, wN).

The receiver array 34 may include a plurality of receivers 60 (which may correspond to $RX_1$ 14 and $RX_2$ 16 and in some cases additional receivers), each of which may provide its respective output to a corresponding analog to digital converter (ADC) 62, which may then provide an output to a respective matched filter (e.g., MF1, MF2 and MF3) prior to providing an input to a signal processor 64. The respective matched filters may enable separation of signals that fail to match a corresponding match filter from those that do not.

Thus, the matched filters may provide signal separability as described herein by selecting signals coded to match the respective matched filter for passage, while filtering out other signals. The signal processor 64 may be a part of in communication with or under the control of the processor 40 and may be configured to process the input signals received by the receiver array 34 (which may correspond to echo returns received as combinations of the transmitted signals such as w1+w2+ . . . +wN) based in some cases also on the timing information provided by the array logic/clock 56 in order to provide detection and tracking data.

Due to the fact that embodiments of the present invention employ more than one transmitter (e.g., $TX_1$ 10 and $TX_2$ 12 and in some cases additional transmitters) a mechanism must be employed in order to provide signal separability. Accordingly, for example, some embodiments of the present invention provide for coding of the transmitted signals (e.g., w1+w2+ . . . +wN) in order to enable differentiation of the signals from each other and from multipath returns. In this regard, in an exemplary embodiment, orthogonal waveforms may be used for differentiation there between. Thus, when combined with geometric processing for interferometry based on the basic arrangement described above in relation to the example of FIG. 1, an orthogonal interferometer may be essentially provided that may enable a multi-mode, multi-static interferometer to be produced with improved detection and tracking capabilities, particularly in multi-contact or other difficult operating environments.

The processor 40 may be configured to provide that the transmitter array 32 produces orthogonal waveforms for transmission via the transmitters 50. In this regard, for example, the processor 40 (e.g., via the waveform processor 54) may direct the waveform generators 52 to each produce orthogonal waveforms using a coding mechanism such as, for example, Kasami codes, code division multiple access (CDMA), time division multiple access (TDMA), frequency division multiplexing (FDM) or the like. The processor 40 may be further configured to interface with the receiver array 34 in order to enable coherent, non-coherent or independent processing (e.g., via the signal processor 64) of the received data. In this regard, for coherent processing, the same clock (e.g., the array logic/clock 56 of FIG. 3) may be used for all transmitters and receivers. Meanwhile, for non-coherent processing each transmitter and receiver pair may be coherent, but all separately received paths are not compared in a coherent fashion. In independent processing, each pair of transmitters and receivers may be operated independent of each other as separate transmitter and receiver pairs. Although ordering with respect to the modes of operation is not important and additional modes could also be employed in some systems, hereinafter independent processing will be referred to as mode 1, non-coherent processing will be referred to as mode 2 and coherent processing will be referred to as mode 3. The various modes of processing will be described below in greater detail.

In an exemplary embodiment, the apparatus 30 may operate as an orthogonal interferometer and the transmitter array 32 and the receiver array 34 may include two or more transmit and receive subsystems, respectively (e.g., two or more pairs of transmitters/receivers such as a pair including $TX_1$ 10 and $RX_1$ 14 and another pair including $TX_2$ 12 and $RX_2$ 16), with separate antennas. The antennas may be embodied as, for example, non-scanning fixed antennas or electronically scanned phased array antennas that are configured to provide enhanced target tracking capability. Each antenna may include a separate orthogonal channel that enables transmission and reception of waveforms that have a relatively low cross correlation when processed through matched filters at the respective channels. Thus, an orthogonal interferometer according to an exemplary embodiment may include multiple radars with coherent alignment among transmitted and received waveforms that can be created using a common reference.

Accordingly, embodiments of the present invention may be employed in the context of producing an Orthogonal Interferometer Fire Control Radar. An example of an orthogonal interferometer (OI) applied to weapon fire control may include three antennas, however, any number of antennas can be used in an orthogonal interferometer radar system. The antenna separation distance will determine the angle-of-arrival measurement accuracy of the orthogonal interferometer since angle accuracy is inversely proportional to the distance between antennas. For a three antenna system the antennas can be located on a plane with equal distance between each pair of antennas. Thus, the antennas may be located on the vertices of an equilateral triangle. In general, by making the triangle larger in size (e.g., by increasing the distance between each pair of antennas and thereby increasing the length of each leg of the triangle), the accuracy of the OI may be increased.

Figure 4:
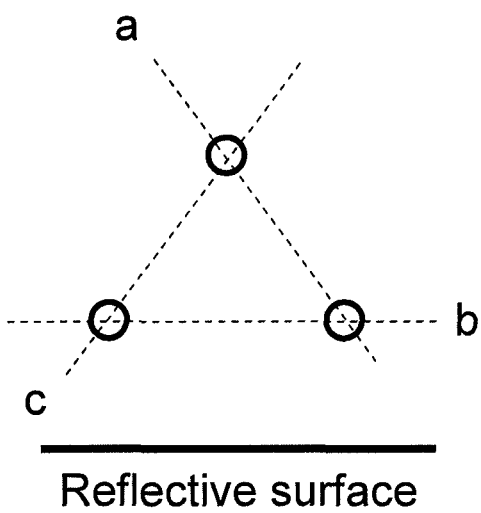
FIG. 4 is a block diagram showing an exemplary antenna system to illustrate a possible placement of three elements according to an exemplary embodiment of the present invention.
Figure 5:
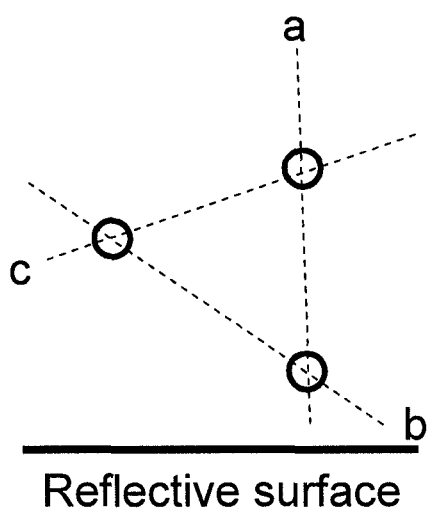
FIG. 5 is a block diagram showing an exemplary antenna system to illustrate an alternative arrangement for three radar elements according to an exemplary embodiment of the present invention.

FIG. 4 is a block diagram showing an exemplary antenna system to illustrate a possible placement of three elements (e.g., elements a, b and c), which may be either receivers or transmitters or both, relative to each other and a nominal reflective surface or plane, which is a common source of multipath. If a line connecting any two element is parallel of nearly parallel to the reflecting plane (e.g., the line between elements b and c) then the multipath from or to the corresponding elements from a RPNCO will behave similarly perhaps reducing the effect of the second mode of operation. FIG. 5 is a block diagram showing an exemplary antenna system to illustrate a possible solution to the problem illustrated in FIG. 4. In this regard, if the elements are arranged such that no line that connects any two elements is close to parallel to the reflective surface, the likelihood of multipath reducing performance may be reduced.

Considering a situation in which three antennas are set up in a triangular formation (such as is shown in FIGS. 4 and 5), an exemplary embodiment will now be described. In this regard, the antennas may be transmitting uniquely coded waveforms that can be separated, based on the unique coding, in the receiver and processing components at each radar subsystem. Thus, each radar subsystem may be configured to transmit a unique waveform and receives that waveform with minimal interference from the other transmitted waveforms. Waveforms can be separated by time, frequency, and/or phase coding. As such, each independent radar subsystem can transmit, receive, and process its own unique waveform and/or can receive and process waveforms transmitted by the other radar subsystems that comprise the orthogonal interferometer. Moreover, in some cases, an orthogonal interferometer according to an embodiment of the present invention may include one pair of a transmitter and corresponding receive antenna at each of elements a, b and c of FIG. 5, rather than having a receive only antenna at each of elements a, b and c, with a transmit only antenna positioned near a center of the triangular arrangement as is provided with a conventional interferometer.

By way of explanation with respect to how unique waveforms may be received and processed, let wi denote the waveform transmitted by the ith radar subsystem that makes up the orthogonal interferometer. The matched filtering process consists of convolving the transmitted waveform with the received waveform. Where ⊗ denotes the convolution operator, the following orthogonality condition may exist:

$$\max(wi \otimes wj) \ll 1 \text{ when } i \neq j$$

$$wi^* wj^T = 1 \text{ when } i = j.$$

In order to determine angle-of-arrival for a return signal received at a receiver antenna, the processing at each radar subsystem consists of the following functions:
1). For each waveform wi, determine the in-phase and quadrature components of the received signal.
2). Compute the phase of the received signal. For wideband waveforms the time of arrival is computed using the common coherent reference.
3). Compute phase differences among pairs of antennas.
4). Unwrap phase (or time) differences to resolve $2\pi$ phase ambiguities.
5). Using phase (or time) differences compute the angle-of-arrival using a coordinate frame determined by the orientation of the antennas.
Range to a target is determined using time of arrival as in a conventional radar (e.g., via the radar range equation).

Some advantages to using an orthogonal interferometer to track targets of interest may include the provision of an enhanced angle-of-arrival measurement capability and enhanced multiple signal processing capability. In relation to the provision of an enhanced angle-of-arrival measurement, the orthogonality condition enables phase rotation in each transmitted waveform to be determined on both the outbound and inbound paths, thus improving angle resolution by a factor of two over conventional interferometers with the same antenna spacing. The factor of two improvement in angle resolution further translates into improved angle accuracy over conventional interferometers.

In relation to enhancing capabilities for multiple signal processing, the orthogonality condition enables multiple matched filters per receiver at each antenna so that all transmitted waveforms can be processed simultaneously at each individual radar subsystem. As an example, let wij denote the waveform transmitted by radar subsystem i and received by radar subsystem j. If there are N number of subsystems and each subsystem transmits a unique waveform, then each radar subsystem receives and processes N number of waveforms (e.g., one unique waveform for N number of radar subsystem). In such a situation, some unique performance improvements may be possible. In this regard, for example, target detection may be enhanced due to the number of signals processed. Coherent integration of N signals at each radar subsystem may increase signal-to-noise by a factor N primarily due to the additional gain on transmit and receive signals. Non-coherent integration of N signal will increase signal-to-noise by a factor of the square root of N. If instead of coherently integrating the N signals, the radar subsystems are cohered on transmit and receive, then coherent beamforming will provide an $N^2$ increase in signal-to-noise.

Target detection may also be enhanced in a multipath environment. In this regard, for a target in a mutipath environment, the N number of waveforms define $N^2$ number of path lengths from the N antennas to the target and back to each of the antennas. Some of those paths are correlated due to the fact that they trace out the same path such as wij and wji. The total number of correlated paths is $(N-1)+(N-2)+\ldots+1=N^*(N-1)/2$. The total number of uncorrelated paths is $N^*(N+1)/2$. In a multipath environment, these $N^*(N+1)/2$ uncorrelated paths can decorrelate multipath depending on the positioning of the interferometer antennas relative to the multipath reflecting plane. Non-uniform (e.g., random) antenna positions can be used to ensure the maximum multipath decorrelation. Since multipath can enhance signals as well as degrade signals, and assuming uniform distribution of multipath over the antenna configuration, then on the average half of the signals will increase signal-to-noise and half will decrease signal-to-noise. With a multipath reflection coefficient of $\rho$, the average improvement in SNR is $N(N+1)(1+\rho^2)/2$ (e.g., sum$(1+\rho^2+2\rho \cos(\phi))$).

Another potential advantage that may be realized by an orthogonal interferometer relates to the concept that interferometry in a multipath environment in which at least three of the signals with increased signal-to-noise are provided may maintain reliable phase measurements. With N number of radar subsystems and $N(N+1)/2$ uncorrelated paths, the probability that three paths increase signal-to-noise approaches unity as N gets large. Thus, the orthogonal interferometer can accurately determine angle-of-arrival using the three signals among $N(N+1)/2$ signals that have the highest signal-to-noise.

Still another potential advantage that may be realized by an orthogonal interferometer relates to angle-of-arrival resolution. Angle-of-arrival resolution can be enhanced due to the number of paths. In this regard, for two antennas it can be easily illustrated using $\phi_{11}=4\pi R_1/\lambda$, $\phi_{22}=4\pi R_2/\lambda$, $\phi_{12}=2\pi(R_1+R_2)/\lambda$, and $\phi_{21}=2\pi(R_2+R_1)/\lambda$ where $\phi_{ij}$ is the phase of the wij waveform. Then $$\phi_{11}+\phi_{12}+\phi_{21}-\phi_{22}=8\pi R_1/\lambda$$

$$\phi_{22}+\phi_{12}+\phi_{21}-\phi_{11}=8\pi R_1/\lambda$$

The factor of $8\pi$ increases the resolution by a factor of four using all of the path lengths. For N number of antennas there is a linear combination of phase measurements that yields a 2N improvement in angle resolution. Angle accuracy may improve based upon how receiver noise is decorrelated over the $N^2$ phase measurements.

Based on the advantages that may be provided by orthogonal interferometry, an orthogonal interferometer may be a preferred application where enhanced angle accuracy and/or resolution is desired. Some primary applications may include fire control radar for guided weapons, radar imaging systems, missile seekers, and phased array radars where the array can be partitioned into multiple subarrays.

A comparison of an orthogonal interferometer to a conventional interferometer may be useful in further appreciating benefits associated with orthogonal interferometry. In this regard, in order to achieve the angle accuracy required for high probability of kill (Pk) and also remain cost effective, it may be desirable in some cases to use an RF interferometer for interceptor guidance. A conventional interferometer (CI) uses a single transmit array and three receive only arrays where as the Orthogonal Interferometer (OI) uses three transmit and receive (T/R) arrays. Of the three transmit and receive arrays of the OI system, each may be provided in a monostatic configuration or possibly a bistatic configuration. The OI system may be considered in some cases to be desirable when angle accuracy is a significant factor with respect to resource allocation. The OI system may maintain or enhance sensitivity improvement for angle of arrival error and target detection relative to the CI design, with a moderate increase in transmit power requirements. However, in addition to medium range command guided intercept, the energy field that is transmitted by the three OI arrays can be used to guide several low-cost interceptors to a target at short-to-medium range with minimal duty impact. A system is proposed that uses command guidance as the primary method for guiding an interceptor to the target and a secondary semi-active guidance technique for multiple saturated targets.

The CI interferometer includes of three receive arrays located at the vertices of an equilateral triangle with a baseline of 2.5-3 meters and one transmit array located at the center of the triangle. The transmit array according to one CI example includes 19 transmit modules with 127 elements per module and each receive array includes 7 modules with 127 elements per module.

In contrast, the OI system may include three coherent transmit/receive arrays located at the vertices of the equilateral triangle (e.g., as shown in FIG. 5) where each array is transmitting an orthogonal waveform and each array is capable of receiving all three waveforms. It is assumed, for purposes of discussion, that the waveforms are coherent and perfectly orthogonal or at least have very low cross correlation properties. One advantage of the OI system is that each array can process three coherent waveforms simultaneously due to the low cross correlation properties thereby theoretically providing a factor of three improvement in SNR at each array. However, when each T/R array for the OI system is smaller in aperture than the CI transmit array, the OI system may experience a SNR loss at each array relative to the CI system. Accordingly, considerations regarding array sizing for the OI system may include considering power and weight constraints as well as overall system performance.

With the proliferation of rocket, artillery, and mortar (RAM) threats, there may be a corresponding need to develop an effective, low cost response to such threats. Conventional active and semi-active kinetic energy interceptors often require dedicated target tracking and handover of the target state dynamics to the interceptor for seeker acquisition. This detection and handover process typically requires dedicated sensor and seeker resources that can be overwhelmed when the target environment is saturated. For the Extended Area Protection and Survivability (EAPS) Program and the Active Protection System (APS), the fire control radar is required to detect, track, and engage multiple RAM targets over full 360 degree coverage. Furthermore, the time-of-flight for many of these targets is only a few seconds (or less for APS) which places stringent timeline requirements on an intercept system. In order to effectively engage these threats an effective total system concept is required to reduce sensor resource requirements and interceptor cost.

In an exemplary embodiment, the processor 40 may be configured to perform the calculations described below and the OI system SNRloss may be defined as follows:

$$SNR_{loss} = 3 \times \left(\frac{OI \text{ Array Power}}{CI \text{ Array Power}}\right)\left(\frac{OI \text{ Transmit Gain}}{CI \text{ Transmit Gain}}\right)\left(\frac{OI \text{ Receive Gain}}{CI \text{ Receive Gain}}\right)$$

$$= 3 \times \left(\frac{OI \text{ Transmit Aperture}}{CI \text{ Transmit Aperture}}\right)^2 \left(\frac{OI \text{ Receive Aperture}}{CI \text{ Receive Aperture}}\right)$$

The factor of three is due to the coherent combination of the three signals at each array. The system transmit power ratio may be defined by, $$\text{Power Ratio} = \frac{OI \text{ Power}}{CI \text{ Power}} = \frac{OI \text{ Transmit Aperture}}{CI \text{ Transmit Aperture}}$$

$$= \frac{\text{Number of } OI \text{ Transmit Modules}}{\text{Number of } CI \text{ Transmit Modules}}$$

In order to estimate the cost ratio, it may be assumed that most of the cost of each system is in the antenna and that transmit modules cost 50% more than receive modules.

$$\text{Cost Ratio} = \frac{1.5 \times \text{Number of } OI \text{ Transmit/Receive Modules}}{1.5 \times \text{Number of } CI \text{ Transmit Modules} + \text{Number of } CI \text{ Receive Modules}}$$

In order to estimate the impact of the OI system on angle error, consider the impact on a two array OI system separated by D meters. Let r1 and r2 denote the range to the target from each of the two respective arrays and let θ denote the angle of arrival of the signal from the target. Then the phase at each array for the two signals is given by, $$\varphi_1 = \frac{4\pi}{\lambda} r_1 \quad \varphi_2 = \frac{4\pi}{\lambda} r_2$$

and $$\Delta\varphi_{12} = \varphi_1 - \varphi_2 = \frac{4\pi}{\lambda}(r_1 - r_2)$$

Since $r_1 - r_2 \approx D \sin(\theta)$ we have $$\Delta\varphi_{12} = \frac{4\pi}{\lambda} D \sin(\theta)$$

or $$\sin(\theta) = \frac{\lambda}{4\pi D}(\varphi_1 - \varphi_2)$$

Computing the angle error for the OI system we have, $$\sigma_\theta^{OI} = \frac{\lambda}{4\pi D \cos(\theta)\sqrt{SNR}}$$

or $$\sigma_\theta^{OI} = \frac{\lambda}{2\pi D \cos(\theta)\sqrt{4SNR}}$$

The angle error for the CI system is given by, $$\sigma_\theta^{CI} = \frac{\lambda}{2\pi D \cos(\theta)\sqrt{SNR}}$$

Note that there is a factor of four (6 dB) reduction in SNR for the OI system compared to the CI system to achieve an equivalent performance in angle error. The angle error reduc tion factor is defined as the ratio of the OI error to the CI error for equivalent SNR.

$$\text{Angle Error Ratio} = \frac{\sigma_\theta^{CI}}{\sigma_\theta^{OI}} = 2\frac{\sqrt{SNR_{OI}}}{\sqrt{SNR_{CI}}}$$

and relating angle error to SNRloss defines $$\text{Angle Error Ratio} = \frac{2}{3}\sqrt{SNR_{loss}}.$$

Figure 12:
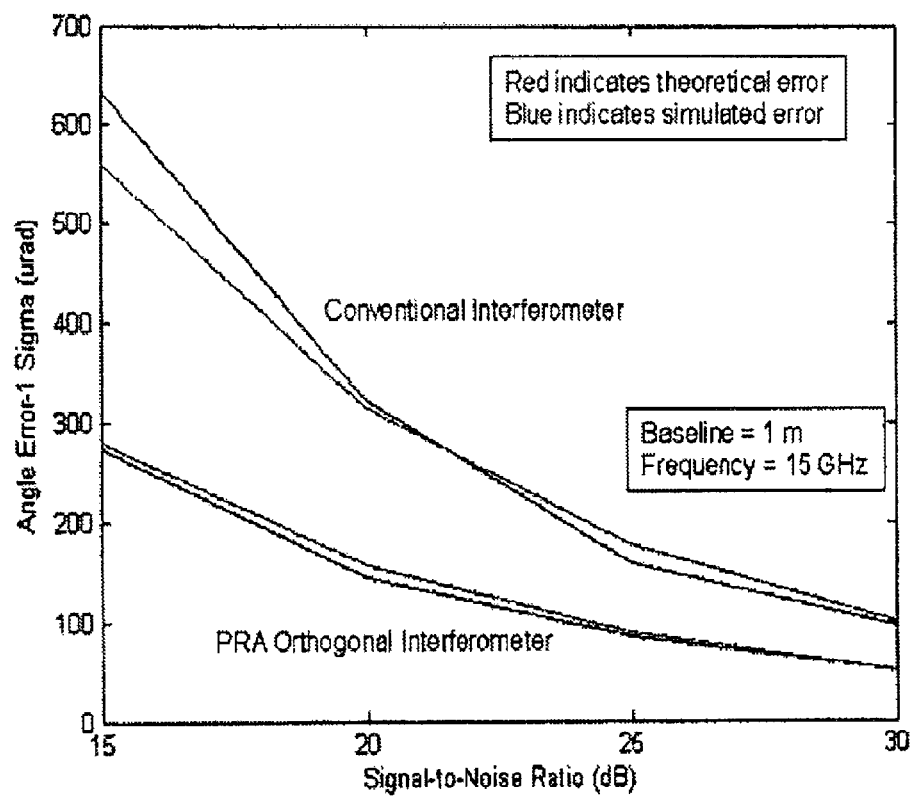
FIG. 12 is a table illustrating improvements in angle accuracy according to an exemplary embodiment of the present invention.

For angle error loss greater than 1 (positive dB), OI is providing better angle estimation than CI. The factor of three reduction is due to the fact that, for phase noise, SNR is determined by the SNR for each signal at each array and not the coherent combination of the output of the three signals. FIG. 12 shows the improvement in angle accuracy with an orthogonal interferometer (referred to in FIG. 12 as "PRA Orthogonal Interferometer") compared to the SWORD conventional interferometer when the SNR at each arrays is equivalent for each architecture. SWORD was an interferometer designed to use a transmit array including 19 modules and three receive arrays including 7 modules each for a total of 40 modules. A module including 127 X-band transmit or receive elements.

In general, OI systems compare favorably to CI systems in relation to measurables such as SNRloss, Power Ratio, Cost Ratio, and Angle Error Loss as a function of the number of modules (M). However, there are several factors to consider with respect to any attempt to quantify the exact improvement that the OI architecture will have over the CI architecture, thereby making such determinations difficult. In general terms, exemplary embodiments of OI systems that provide improvement in angle resolution coupled with coherent integration gains allow the OI system to trade off cost and power for performance.

Figure 6:
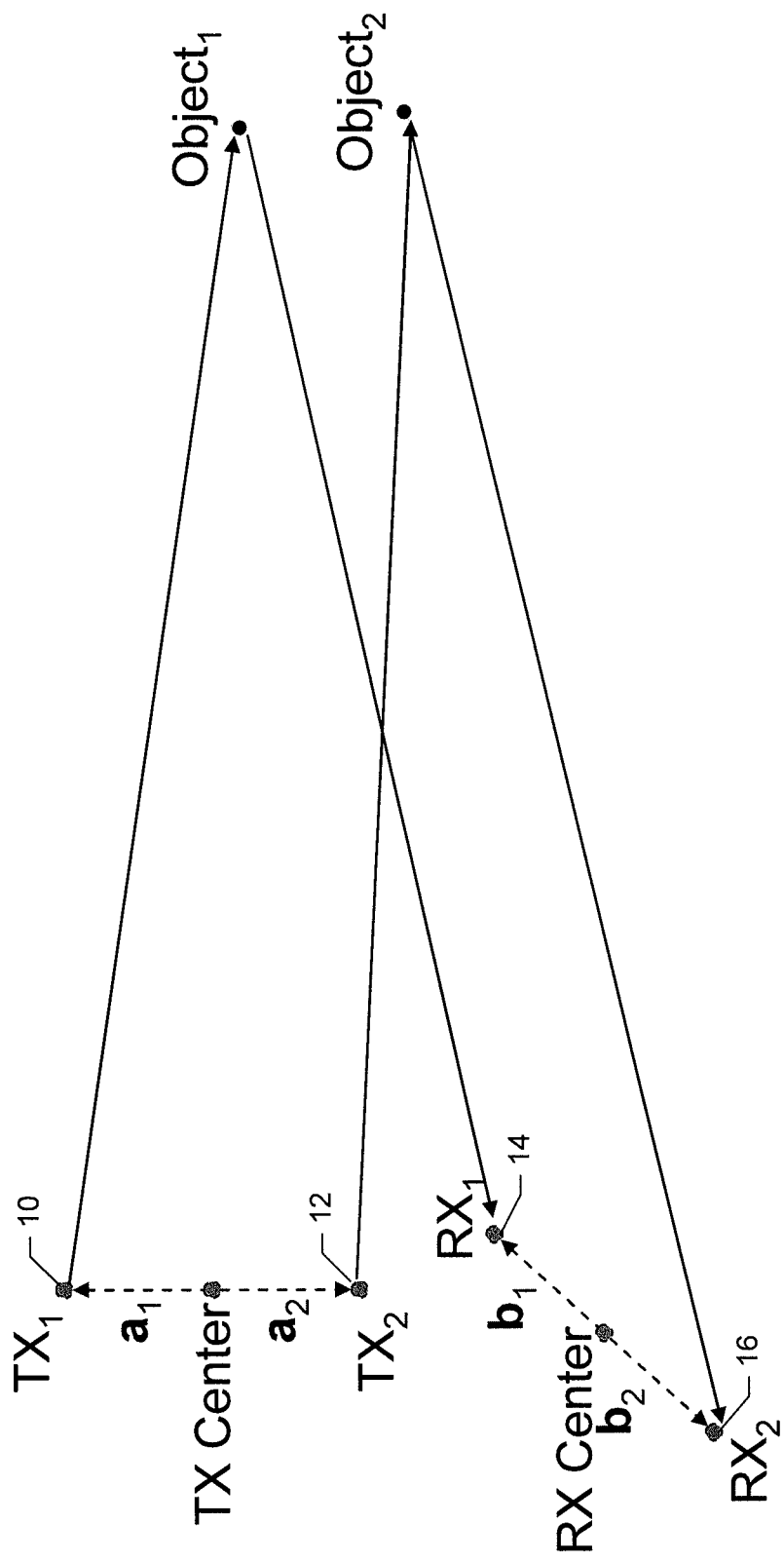
FIG. 6 is a diagram illustrating independent operation of multi-static radars according to an exemplary embodiment of the present invention.

FIG. 6 is a diagram illustrating independent operation of multi-static radars according to an exemplary embodiment. In the example of FIG. 6, which corresponds to the first mode of operation (e.g., mode 1), each transmitter (e.g., $TX_1$ 10 and $TX_2$ 12) can be paired with a corresponding one or more receivers (e.g., $RX_1$ 14 and $RX_2$ 16) to create a set of N multi-static radars or interferometers. Each set could operate independently from all other systems thereby allowing for the detection and tracking of more objects than would otherwise be possible with a single transmitter and receiver(s) configuration. In this example, assume that $TX_1$ is paired with $RX_1$ in a bi-static configuration to track $Object_2$. Similarly, in this example, assume that $TX_2$ is paired with $RX_2$ in a bi-static configuration to track $Object_2$. Because, each signal (e.g., the signal transmitted by $TX_1$ for the tracking of $Object_1$ and the signal transmitted by $TX_2$ for the tracking of $Object_2$) can be differentiated from all other signals due to the coded nature (e.g., via orthogonality) of the signals, it is possible for the processor 40 to rapidly create the pairings described above and make the signal and timing measurements needed for processing.

Figure 7:
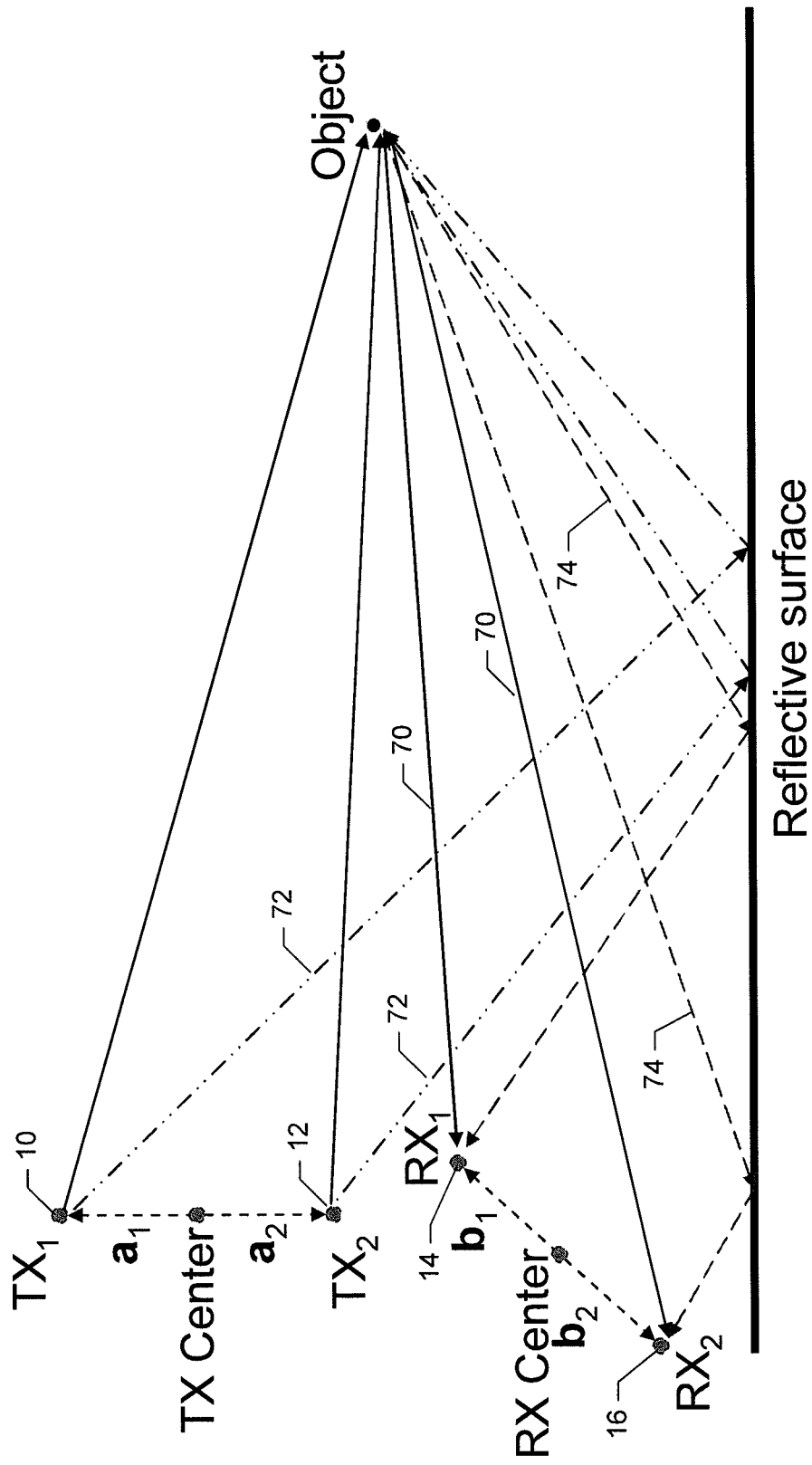
FIG. 7 is a diagram illustrating non-coherent operation of a radar system according to an exemplary embodiment of the present invention.

FIG. 7 is a diagram illustrating non-coherent operation of a radar system according to an exemplary embodiment. In the example of FIG. 7, which corresponds to the second mode of operation (e.g., mode 2), each transmitter (e.g., $TX_1$ 10 and $TX_2$ 12) directs its radiant energy at the object and each receiver (e.g., $RX_1$ 14 and $RX_2$ 16) receives the reflected energy for each respective transmitter. In one instance (shown by solid lines 70) the radiated energy may travel directly (e.g., as a direct path signal) from a transmitter (e.g., $TX_1$ 10) to the object, and then directly from the object to the corresponding receiver (e.g., $RX_1$ 14). However, due to the finite beamwidth and sidelobe response of both the transmit- and receive-apertures, the direct path signals may be corrupted with multipath signals. Thus, FIG. 7 shows examples of first order single excess reflections (indicated by dotted and dashed lines 72 and 74) as specular multipath signals. In this regard, lines 72 illustrate a first order multipath reflection of the transmitted signals from $TX_1$ 10 and $TX_2$ 12 off of a reflective surface and then off of the object. Lines 74 illustrate a first order multipath reflection of the return signal off the reflective surface before returning to a corresponding one of $RX_1$ 14 and $RX_2$ 16. The multipath signals and the direct path signals may be received at the receivers (e.g., $RX_1$ 14 and $RX_2$ 16). When the multipath signals are added to the direct path signals, the corresponding receiver for which such signals are added may observe a signal that fluctuates in strength as the length of the direct and multipath signal paths change relative lengths. However, because there are a multitude of paths, differentiated by the signal coding and the receiver used, and because each path is different in length (due to being multipath), the non-coherent processing of the received signals may lead to an output signal with reduced amplitude fluctuations for improved detection.

Non-coherent processing according to this example may include processing that does not account for the phase difference between signals. For example, non-coherent processing according to this example may include summing the magnitude of two paths together or taking an average of the set of paths with a magnitude above some predefined level.

Figure 8:
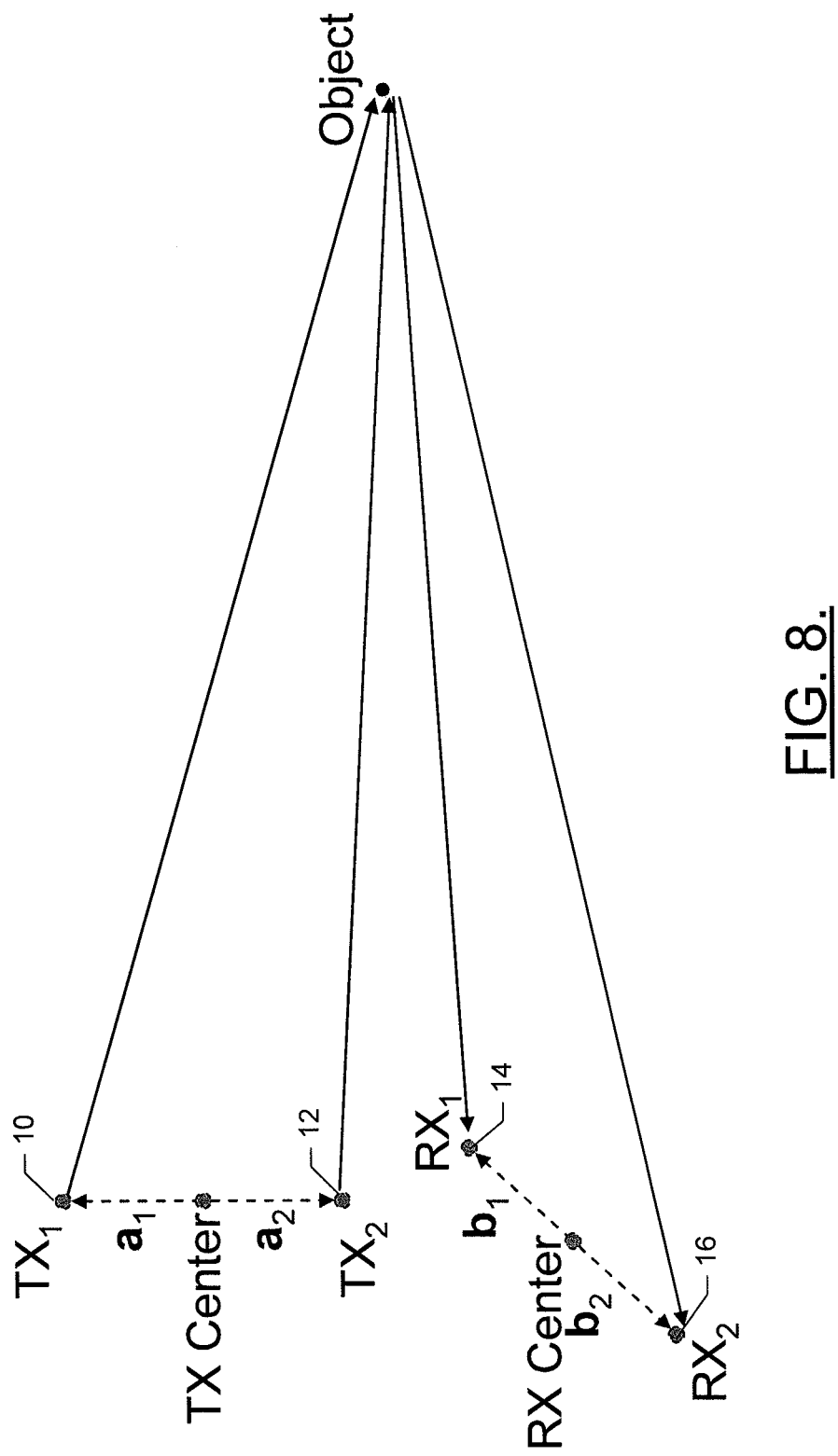
FIG. 8 is a diagram illustrating coherent operation of a radar system according to an exemplary embodiment of the present invention.

FIG. 8 is a diagram illustrating coherent operation of a radar system according to an exemplary embodiment. In the example of FIG. 8, which corresponds to the third mode of operation (e.g., mode 3), each transmitter (e.g., $TX_1$ 10 and $TX_2$ 12) each transmitter directs its radiant energy at the object and each receiver receives the reflected energy from each transmitter (the dark solid lines). Cohering the arrays provides N times the power, where N is the number of transmitters, N times the transmit gain, and M times the receive gain where M is the number of receivers. This gives Improvement=10*log($N*N*M$) dB.

If N=3 and M=3 this would be 15 dB more SNR than an individual path (transmitter receiver pairing) would have.

Figure 9:
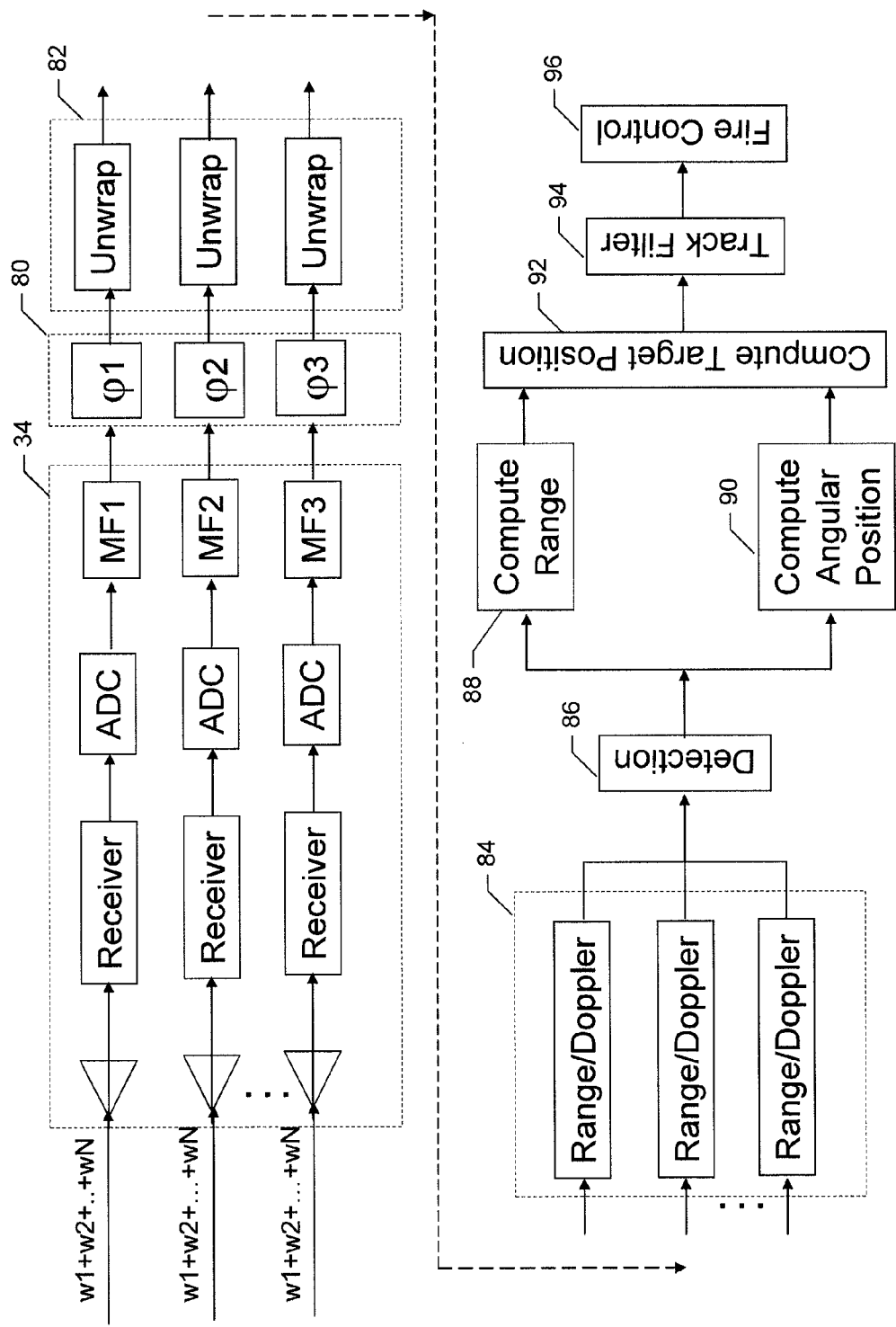
FIG. 9 illustrates a block diagram showing signal processing according to an exemplary embodiment of the present invention.

FIG. 9 illustrates a block diagram showing signal processing according to an exemplary embodiment of the present invention. As shown in FIG. 9, each receiver of the receiver array 34 may receive the combined signal returning from a target (e.g., w1+w2+ . . . +wN). Blocks following the receiver array 34 in FIG. 9 represent various processes that may be accomplished or components that may be encountered as the signal processor 64 of FIG. 3 performs signal processing. In this regard, after match filtering isolates the return that corresponds to each respective receiver (e.g., w1 for the first receiver, w2 for the second receiver and wN for the Nth receiver), a corresponding angle is determined for each respective signal at angle determination operation 80. Unwrapping is then performed on each respective signal at unwrapping operation 82. After signal unwrapping, range and/or Doppler information is analyzed for each signal at operation 84. Based on the results of the range/Doppler analysis, a detection operation 86 is performed. After detecting a target or object, range computation 88 and angular position computation 90 are performed and the combination of range and angular position information provides for computation of target position 92. Track filtering may thereafter be performed at operation 94 and the information may be fed to a fire control system 96.

Figure 10:
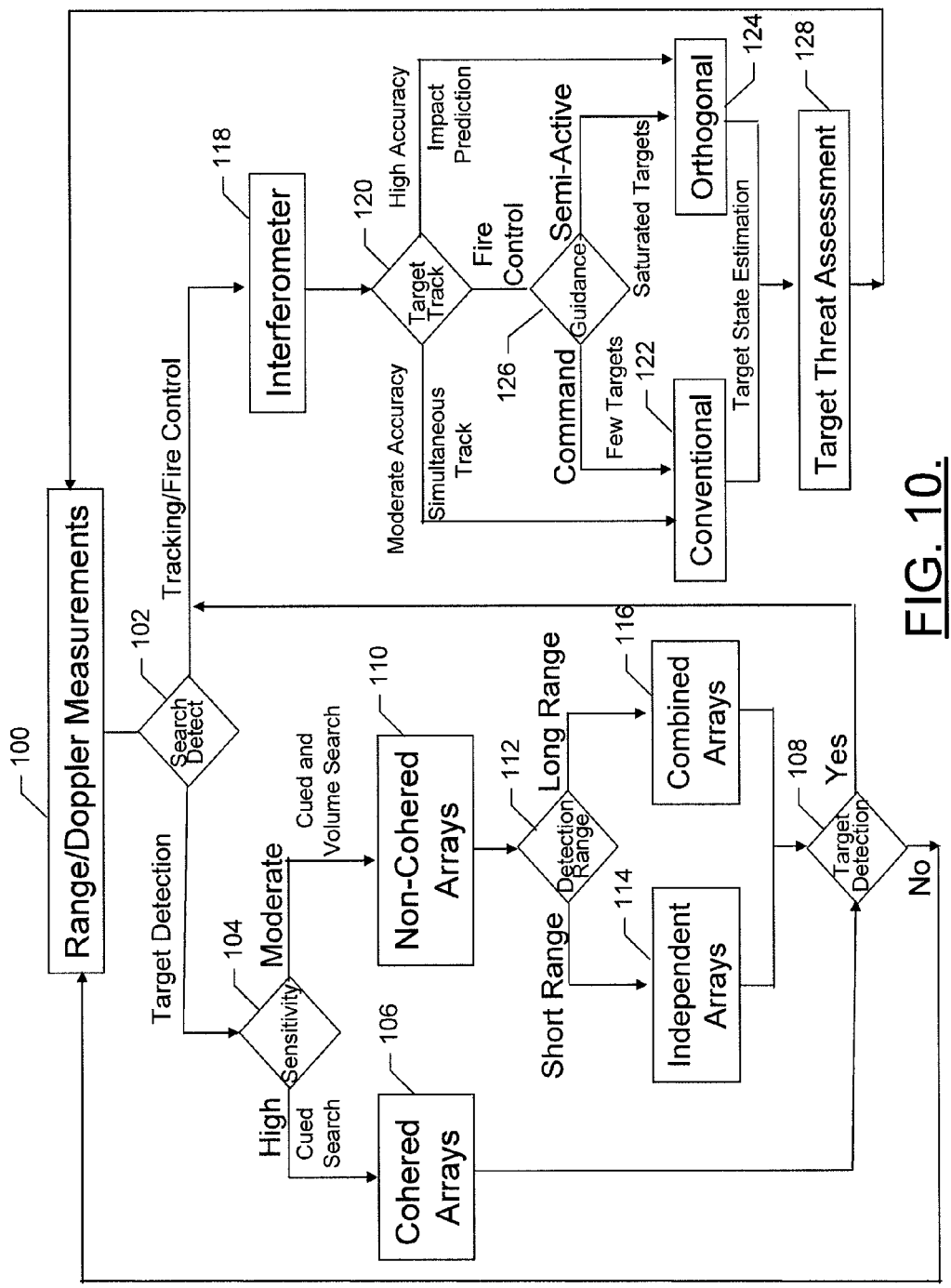
FIG. 10 illustrates a block diagram showing an operational flow for an automated or user defined operating mode according to an exemplary embodiment of the present invention.

FIG. 10 illustrates a block diagram showing an operational flow for an automated or user defined operating mode according to an exemplary embodiment. For example, this flow can be executed by the mode controller 46 and processor 40 as they operate transmitter array 32, receiver array 34 and user interface 42 of FIG. 2. As shown in FIG. 10, range and/or Doppler measurements may initially be made at operation 100. Based on the range and/or Doppler measurements, a target detection or tracking decision may be made at operation 102. If target detection is appropriate (e.g., if there is not already an existing target being tracked), a sensitivity determination may be made at operation 104. If sensitivity is high (e.g., for a cued search), cohered arrays may be employed at operation 106. In other words, mode 3 operation may be undertaken. A decision may again be made at operation 108 as to whether a target is detected. If a target is detected, operation may proceed to tracking the detected target (e.g., via mode 1 operation). However, if no target is detected, the processing may return to operation 100.

If the sensitivity is determined to be moderate (e.g., for a cued and volume search), non-cohered arrays may be employed at operation 110. A decision may then be made at operation 112 with respect to whether the detection range is short or long. If short range detection is determined, independent arrays may be employed at operation 114. However, if long range detection is determined, combined arrays may be employed at operation 116. Regardless of the array employed, operating flow may return to operation 108 as described above.

If the result of the decision at operation 102 directs for tracking to be performed for a particular target, an interferometer may be employed at operation 118 and a tracking decision may be made at operation 120 with respect to accuracy requirements (or desires). If moderate accuracy is desired or required, simultaneous tracking of multiple objects may be performed and conventional interferometry may be employed at operation 122. If high accuracy is desired or required, impact prediction may be performed and orthogonal coding may be employed according to an exemplary embodiment of the present invention at operation 124. If a fire control situation is in progress, a guidance decision may be made at operation 126 between command guidance and semi-active guidance. Command guidance may be employed in situations in which few targets are present and thus conventional interferometry may be employed at operation 122. Semi-active guidance may be employed in situations in which there is a large number of targets and thus orthogonal interferometry may be employed at operation 124. Whether orthogonal or convention interferometry is employed, target state estimation may be enabled so that a target threat assessment may be performed at operation 128, after which operating flow may return to operation 100.

Figure 11:
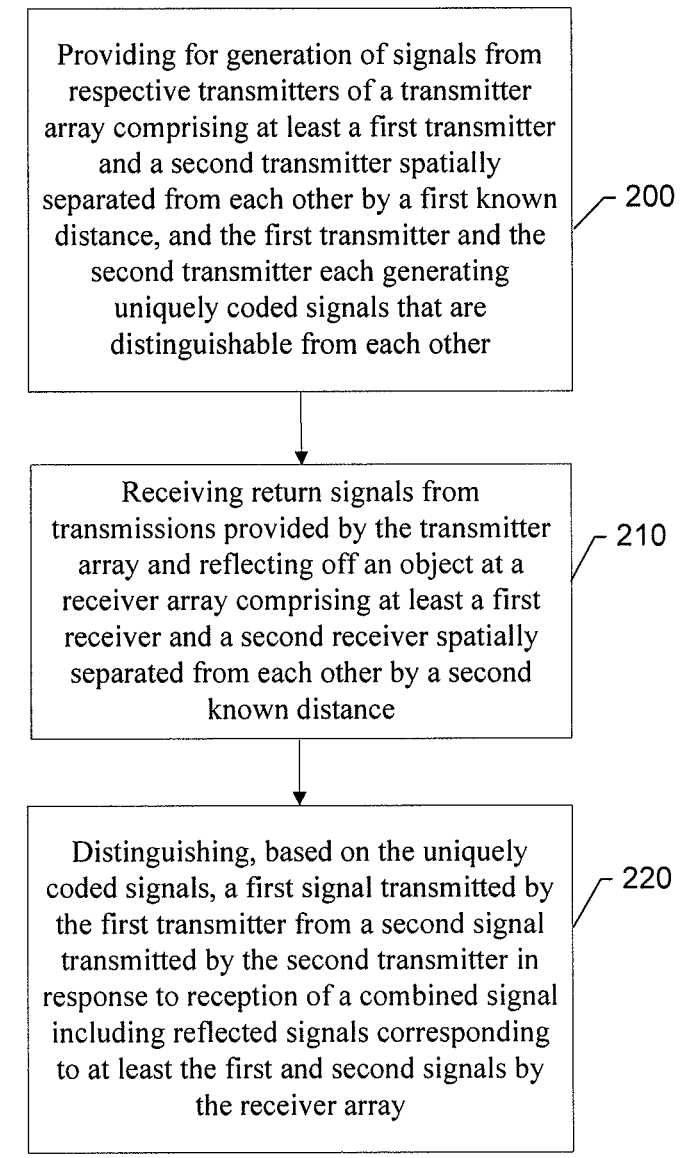
FIG. 11 is a flowchart according to an exemplary method of providing a multi-mode, multi-static interferometer utilizing pseudo orthogonal codes according to an exemplary embodiment of the present invention.

FIG. 11 is a flowchart of a system, method and program product according to exemplary embodiments of the invention. It will be understood that each block or step of the flowcharts, and combinations of blocks in the flowcharts, may be implemented by various means, such as hardware, firmware, processor, circuitry and/or other devices associated with execution of software including one or more computer program instructions. For example, one or more of the procedures described above may be embodied by computer program instructions. In this regard, the computer program instructions which embody the procedures described above may be stored by a memory device and executed by a processor. As will be appreciated, any such computer program instructions may be loaded onto a computer or other programmable apparatus (.e.g., hardware) to produce a machine, such that the resulting computer or other programmable apparatus embodies means for implementing the functions specified in the flowchart's block(s) or step(s). These computer program instructions may also be stored in a computer-readable memory that may direct a computer or other programmable apparatus to function in a particular manner, such that the instructions stored in the computer-readable memory produce an article of manufacture including instructions the execution of which implement the functions specified in the flowchart's block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart's block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one embodiment of a method for providing a multi-mode, multi-static interferometer utilizing pseudo orthogonal codes as provided in FIG. 11 may include providing for generation of signals from respective transmitters of a transmitter array comprising at least a first transmitter and a second transmitter spatially separated from each other by a first known distance in which the first transmitter and the second transmitter each generate uniquely coded signals that are distinguishable from each other at operation 200. The method may further include receiving return signals from transmissions provided by the transmitter array and reflecting off an object at a receiver array comprising at least a first receiver and a second receiver spatially separated from each other by a second known distance at operation 210. The method may also include distinguishing, based on the uniquely coded signals, a first signal transmitted by the first transmitter from a second signal transmitted by the second transmitter in response to reception of a combined signal including reflected signals corresponding to at least the first and second signals by the receiver array at operation 220.

In an alternative exemplary embodiment, further optional operations may be included. In this regard, the method may further include performing a mode selection between modes corresponding to processing the reflected signals based on considering independent transmitter and receiver pairs, non-coherently processed paths between each transmitter and each respective receiver, or coherently processed paths between each transmitter and each respective receiver. The method may also further include processing the reflected signals by determining a time-of-arrival (TOA) of each of the first signal and the second signal, calculating a difference between the TOAs, dividing the difference by a propagation speed of the first and second signals to obtain at least a first path length from the first transmitter to the first receiver and a second path length from the second transmitter to the second receiver, determining a range from the receiver array to a phase center of the transmitter array and an angular position of the receiver array relative to the phase center of the transmitter array based on at least the first and second path lengths, and determining a range from the receiver array to an object and an angular position of the object relative to the receiver array based on one or more of the first and second path lengths, the range and the angular position. In an exemplary embodiment, the method may further include digital beamforming for each transmitter of the transmitter array to provide independent coded beams for independent searches using individual pairs of one transmitter and one receiver from among the transmitter array and the receiver array, respectively, and/or digital beamforming for each transmitter of the transmitter array to provide independent coded beams for coordinated searching using all of transmitter and receiver pairs of the transmitter array and the receiver array, respectively.

In some embodiments, certain ones of the operations above may be modified or further amplified as described below. Optional operations or modifications may be performed in any order and/or in combination with each other in various alternative embodiments. In some cases, the distinguishing of operation 220 may include comparing phase and timing of arrival of the reflected signals in a coherent and non-coherent manner to each other and to the first and second signals to determine a position of the object relative to the receiver array. In an exemplary embodiment, providing for generation of the signals may include generating the first signal and the second signal to be orthogonal to each other.

In an exemplary embodiment, an apparatus for performing the method above may include a processor (e.g., the processor 40) configured to perform each of the operations (200-220) described above. The processor may, for example, be configured to perform the operations by executing stored instructions for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
a transmitter array comprising at least a first transmitter and a second transmitter spatially separated from each other by a first known distance;
a receiver array comprising at least a first receiver and a second receiver spatially separated from each other by a second known distance, the receiver array being positioned to enable receipt of a return signal from transmissions provided by the transmitter array and reflecting off an object; and
a processor configured to enable the transmitter array to generate uniquely coded signals and configured to distinguish, based on the uniquely coded signals, a first signal transmitted by the first transmitter from a second signal transmitted by the second transmitter in response to reception of a combined signal including reflected signals corresponding to at least the first and second signals by the receiver array,
wherein the processor is configured to process the reflected signals by:
determining a time-of-arrival (TOA) of each of the first signal and the second signal;
calculating a difference between the TOAs;
dividing the difference by a propagation speed of the first and second signals to obtain at least a first path length from the first transmitter to the first receiver and a second path length from the second transmitter to the second receiver;
determining at least one of (a) a range from the receiver array to a phase center of the transmitter array or (b) an angular position of the receiver array relative to the phase center of the transmitter array, based on at least the first and second path lengths or a phase difference of the first and second signals; and
determining at least one of (a) a range from the receiver array to an object or (b) an angular position of the object relative to the receiver array, based on one or more of the first and second path lengths, the range, the angular position, or the phase difference.

2. The system of claim 1, wherein the processor is configured to compare phase and timing of arrival of the reflected signals in a coherent and non-coherent manner to each other and to the first and second signals to determine a position of the object relative to the receiver array.

3. The system of claim 1, wherein the processor further comprises a mode controller configured to process the reflected signals based on:
considering independent transmitter and receiver pairs;
non-coherently processed paths between each transmitter and each respective receiver; or
coherently processed paths between each transmitter and each respective receiver.

4. The system of claim 1, wherein each transmitter of the transmitter array utilizes a same physical aperture as a corresponding receiver of the receiver array.

5. The system of claim 1, wherein each transmitter of the transmitter array utilizes a different physical aperture than a corresponding receiver of the receiver array.

6. The system of claim 1, wherein the first signal and the second signal are orthogonal to each other.

7. The system of claim 1, wherein the processor is configured to provide digital beamforming for each transmitter of the transmitter array to provide independent coded beams for independent searches using individual pairs of one transmitter and one receiver from among the transmitter array and the receiver array, respectively.

8. The system of claim 1, wherein the processor is configured to provide digital beamforming for each transmitter of the transmitter array to provide independent coded beams for coordinated searching using all of transmitter and receiver pairs of the transmitter array and the receiver array, respectively.

9. A method comprising:
providing for generation of signals from respective transmitters of a transmitter array comprising at least a first transmitter and a second transmitter spatially separated from each other by a first known distance, and the first transmitter and the second transmitter each generating uniquely coded signals that are distinguishable from each other;

receiving return signals from transmissions provided by the transmitter array and reflecting off an object at a receiver array comprising at least a first receiver and a second receiver spatially separated from each other by a second known distance;

distinguishing, based on the uniquely coded signals, a first signal transmitted by the first transmitter from a second signal transmitted by the second transmitter in response to reception of a combined signal including reflected signals corresponding to at least the first and second signals by the receiver array; and processing the reflected signals by:

determining a time-of-arrival (TOA) of each of the first signal and the second signal;

calculating a difference between the TOAs;

dividing the difference by a propagation speed of the first and second signals to obtain at least a first path length from the first transmitter to the first receiver and a second path length from the second transmitter to the second receiver;

determining at least one of (a) a range from the receiver array to a phase center of the transmitter array or (b) an angular position of the receiver array relative to the phase center of the transmitter array, based on at least the first and second path lengths or a phase difference of the first and second signals; and determining at least one of (a) a range from the receiver array to an object or (b) an angular position of the object relative to the receiver array, based on one or more of the first and second path lengths, the range, the angular position, or the phase difference.

10. The method of claim 9, wherein distinguishing further comprises comparing phase and timing of arrival of the reflected signals in a coherent and non-coherent manner to each other and to the first and second signals to determine a position of the object relative to the receiver array.

11. The method of claim 9, further comprising performing a mode selection between modes corresponding to processing the reflected signals based on:
considering independent transmitter and receiver pairs;
non-coherently processed paths between each transmitter and each respective receiver; or
coherently processed paths between each transmitter and each respective receiver.

12. The method of claim 9, wherein providing for generation of the signals comprises generating the first signal and the second signal to be orthogonal to each other.

13. The method of claim 9, further comprising providing digital beamforming for each transmitter of the transmitter array to provide independent coded beams for independent searches using individual pairs of one transmitter and one receiver from among the transmitter array and the receiver array, respectively.

14. The method of claim 9, further comprising providing digital beamforming for each transmitter of the transmitter array to provide independent coded beams for coordinated searching using all of transmitter and receiver pairs of the transmitter array and the receiver array, respectively.

15. A computer program product comprising at least one computer-readable storage medium having computer-executable program code instructions stored therein, the computer-executable program code instruction comprising:

a first portion containing program code instructions for providing for generation of signals from respective transmitters of a transmitter array comprising at least a first transmitter and a second transmitter spatially separated from each other by a first known distance, and the first transmitter and the second transmitter each generating uniquely coded signals that are distinguishable from each other;

a second portion containing program code instructions for receiving return signals from transmissions provided by the transmitter array and reflecting off an object at a receiver array comprising at least a first receiver and a second receiver spatially separated from each other by a second known distance;

a third portion containing program code instructions for distinguishing, based on the uniquely coded signals, a first signal transmitted by the first transmitter from a second signal transmitted by the second transmitter in response to reception of a combined signal including reflected signals corresponding to at least the first and second signals by the receiver array; and a fourth portion containing program code instructions for processing the reflected signals by:

determining a time-of-arrival (TOA) of each of the first signal and the second signal;

calculating a difference between the TOAs;

dividing the difference by a propagation speed of the first and second signals to obtain at least a first path length from the first transmitter to the first receiver and a second path length from the second transmitter to the second receiver;

determining at least one of (a) a range from the receiver array to a phase center of the transmitter array or (b) an angular position of the receiver array relative to the phase center of the transmitter array, based on at least the first and second path lengths or a phase difference of the first and second signals; and determining at least one of (a) a range from the receiver array to an object or (b) an angular position of the object relative to the receiver array, based on one or more of the first and second path lengths, the range, the angular position, or the phase difference.

16. The computer program product of claim 15, wherein program code instructions for distinguishing further include instructions for comparing phase and timing of arrival of the reflected signals in a coherent and non-coherent manner to each other and to the first and second signals to determine a position of the object relative to the receiver array.

17. The computer program product of claim 15, further comprising program code instructions for performing a mode selection between modes corresponding to processing the reflected signals based on:
considering independent transmitter and receiver pairs;
non-coherently processed paths between each transmitter and each respective receiver; or
coherently processed paths between each transmitter and each respective receiver.

18. The computer program product of claim 15, wherein program code instructions for providing for generation of the signals include instructions for generating the first signal and the second signal to be orthogonal to each other.

19. The computer program product of claim 15, further comprising program code instructions for providing digital beamforming for each transmitter of the transmitter array to provide independent coded beams for independent searches using individual pairs of one transmitter and one receiver from among the transmitter array and the receiver array, respectively.

20. The computer program product of claim 15, further comprising program code instructions for providing digital beamforming for each transmitter of the transmitter array to provide independent coded beams for coordinated searching using all of transmitter and receiver pairs of the transmitter array and the receiver array, respectively.

21. A system comprising:
a transmitter array comprising at least a first transmitter and a second transmitter spatially separated from each other by a first known distance;
a first receiver array comprising at least a first receiver and a second receiver spatially separated from each other by a second known distance, the receiver array being positioned to enable receipt of a return signal from transmissions provided by the transmitter array and reflecting off an object;
a processor configured to enable the transmitter array to generate uniquely coded signals and configured to distinguish, based on the uniquely coded signals, a first signal transmitted by the first transmitter from a second signal transmitted by the second transmitter in response to reception of a combined signal including reflected signals corresponding to at least the first and second signals by the first receiver array; and
a second receiver array comprising at least one receiver being positioned to enable receipt of the transmissions provided by the transmitter array,
wherein the processor is configured to:
determine a time-of-arrival (TOA) of each of the first signal and the second signal with respect to the first receiver array;
determine an angular position of objects relative to the transmitter array and the first receiver array based on the TOA determined for each of the first signal and the second signal with respect to the first receiver array;
enable a determination of a TOA of each of the first signal and the second signal with respect to the second receiver array; and
enable a determination of an angular position of the second receiver array with respect to the transmitter and the first receiver array based on the TOA determined for each of the first signal and the second signal with respect to the second receiver array.

22. The system of claim 21, wherein the processor is configured to compare phase and timing of arrival of the reflected signals in a coherent and non-coherent manner to each other and to the first and second signals to determine a position of the object relative to the first receiver array.

23. The system of claim 21, wherein the processor further comprises a mode controller configured to process the reflected signals based on:

considering independent transmitter and receiver pairs;
non-coherently processed paths between each transmitter and each respective receiver of the first receiver array; or
coherently processed paths between each transmitter and each respective receiver of the first receiver array.

24. The system of claim 21, wherein the processor is configured to process the reflected signals by:
calculating a difference between the TOAs of each of the first signal and the second signal with respect to the first receiver array;
dividing the difference by a propagation speed of the first and second signals to obtain at least a first path length from the first transmitter to the first receiver of the first receiver array and a second path length from the second transmitter to the second receiver of the first receiver array;
determining at least one of (a) a range from the first receiver array to a phase center of the transmitter array or (b) an angular position of the first receiver array relative to the phase center of the transmitter array, based on at least the first and second path lengths or a phase difference of the first and second signals; and
determining at least one of (a) a range from the first receiver array to the object or (b) an angular position of the object relative to the first receiver array, based on one or more of the first and second path lengths, the range, the angular position, or the phase difference.

25. The system of claim 21, wherein the processor is associated with at least one of the transmitter array or the first receiver array, and wherein the processor is configured to communicate guidance information regarding the object to the second receiver array.

26. The system of claim 25, wherein the processor is a first processor, the system further comprising a second processor associated with the second receiver array, wherein the second processor is configured to use the guidance information to determine at least one of (a) a range from the second receiver array to the object or (b) an angular position of the object relative to the second receiver array based on the guidance information.

27. The system of claim 25, wherein the guidance information comprises at least one of (a) the range determined from the first receiver array to the object, (b) the angular position of the object relative to the first receiver array, (c) a range from the second receiver array to the first receiver array, or (d) the angular position of the second receiver array with respect to the transmitter and the first receiver array.

* * * * *